(12) United States Patent
Akahori

(10) Patent No.: US 10,224,756 B2
(45) Date of Patent: Mar. 5, 2019

(54) POWER TRANSMISSION APPARATUS AND POWER TRANSMISSION SYSTEM

(71) Applicant: LAPIS Semiconductor Co., Ltd., Yokohama (JP)

(72) Inventor: Hiroji Akahori, Yokohama (JP)

(73) Assignee: LAPIS Semiconductor Co., Ltd., Yokohama (JP)

( * ) Notice: Subject to any disclaimer, the term of this patent is extended or adjusted under 35 U.S.C. 154(b) by 129 days.

(21) Appl. No.: 15/370,659

(22) Filed: Dec. 6, 2016

(65) Prior Publication Data

US 2017/0163096 A1  Jun. 8, 2017

(30) Foreign Application Priority Data

Dec. 7, 2015 (JP) ................................ 2015-238384

(51) Int. Cl.
    *H02J 50/90* (2016.01)
    *H02J 50/12* (2016.01)
    *H02J 7/02* (2016.01)

(52) U.S. Cl.
    CPC .............. *H02J 50/12* (2016.02); *H02J 7/025* (2013.01); *H02J 50/90* (2016.02)

(58) Field of Classification Search
    CPC .................................. H02J 50/90; H02J 7/025
    See application file for complete search history.

(56) References Cited

U.S. PATENT DOCUMENTS

| 6,573,822 B2* | 6/2003 | Ma ........................... H01F 5/003 336/200 |
| 2011/0046438 A1* | 2/2011 | Iwaisako ............ A61B 1/00029 600/101 |
| 2012/0098486 A1* | 4/2012 | Jung ........................ H02J 5/005 320/108 |
| 2012/0313577 A1* | 12/2012 | Moes ........................ H02J 7/025 320/108 |
| 2015/0357827 A1* | 12/2015 | Muratov .................. H02J 50/10 307/104 |
| 2016/0126639 A1* | 5/2016 | Kim ......................... H02J 50/10 307/104 |
| 2016/0197511 A1* | 7/2016 | Atasoy ..................... H02J 7/025 307/104 |
| 2016/0352147 A1* | 12/2016 | Von Novak, III ...... H02J 50/12 |
| 2017/0040688 A1* | 2/2017 | Peralta ..................... H01Q 7/00 |

FOREIGN PATENT DOCUMENTS

JP   2005-160253 A   6/2005

\* cited by examiner

*Primary Examiner* — Thienvu Tran
*Assistant Examiner* — Pinping Sun
(74) *Attorney, Agent, or Firm* — Rabin & Berdo, P.C.

(57) ABSTRACT

A power transmission apparatus includes a driving circuit, a first power transmission coil that is driven by the driving circuit, a second power transmission coil that is arranged outside the first power transmission coil, a third power transmission coil that is arranged inside the first power transmission coil, and a switching circuit that performs connection switching so that the first power transmission coil is connected to either one of the second and third power transmission coils. The power transmission apparatus transmits power to a power reception coil without contact.

5 Claims, 14 Drawing Sheets

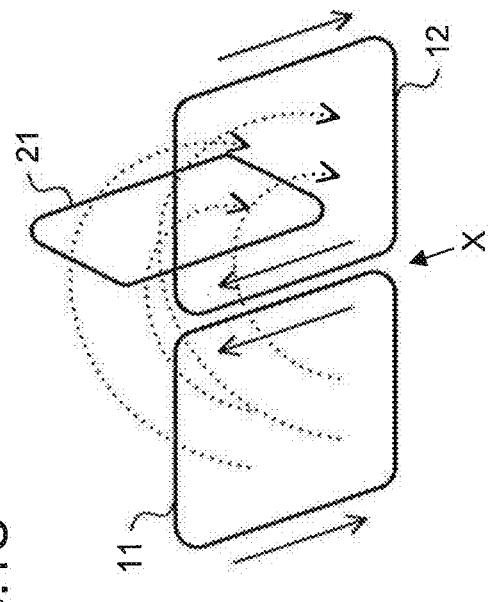 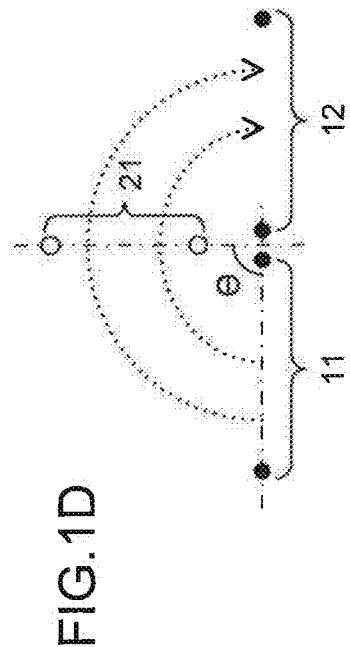
FIG.1A  FIG.1B
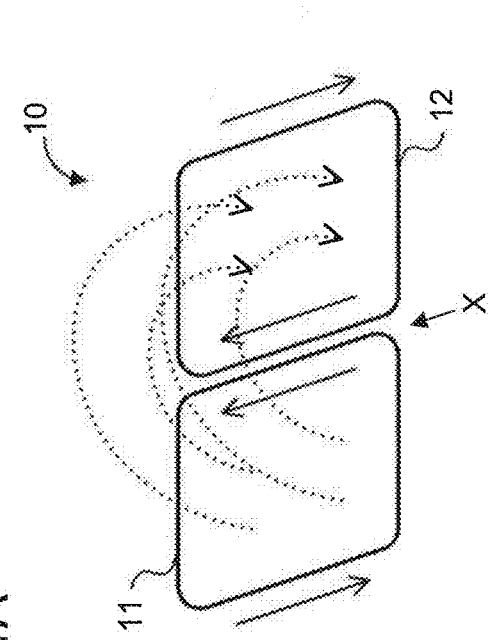 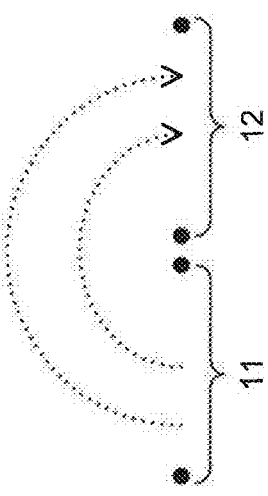
FIG.1C  FIG.1D

FIG.7

| | HORIZONTAL POSITION | INTERMEDIATE POSITION | VERTICAL POSITION | LIMIT POSITION |
|---|---|---|---|---|
| FIRST STATE (SW1,SW3 ON) | Vr1(0) Ir1(0) | Vr1(45) Ir1(45) | Vr1(90) Ir1(90) | Vr1(x) Ir1(x) |
| SECOND STATE (SW2 ON) | Vr2(0) Ir2(0) | Vr2(45) Ir2(45) | Vr2(90) Ir2(90) | Vr2(x) Ir2(x) |

POWER TRANSMISSION APPARATUS AND POWER TRANSMISSION SYSTEM

BACKGROUND OF THE INVENTION

1. Field of the Invention

The present invention relates to a power transmission apparatus and a power transmission system which transmit electric power without contact.

2. Description of the Related Art

For electric power supply to wearable devices, such as a watch, and electric vehicles etc., power transfer systems for transferring electric power without contact are used in recent years. In such power transfer systems, an electromagnetic field generated by passing a current through a coil on a power transmission apparatus side (i.e., power transmission coil) is used to transfer power to a coil on a power reception apparatus side (i.e., power reception coil). In order for the power reception coil to capture a lot of magnetic flux of the magnetic field generated by the power transmission coil, the power transmission coil and the power reception coil are often arranged in parallel and opposed to each other.

To capture a lot of magnetic flux from the power transmission coil, the opening of the power reception coil is desirably formed to have a large area. If the power reception apparatus is a device such as a watch, the power reception coil is usually mounted in parallel with the dial so that a lot of magnetic flux from the power transmission coil is captured (for example, Japanese Patent Application Laid-Open No. 2005-160253).

SUMMARY OF THE INVENTION

As described above, when the power reception coil is mounted on the watch serving as the power reception apparatus in parallel with the dial, the dial side or back lid side of the watch is brought close to the power transmission apparatus for power reception so that the power reception coil can be arranged in parallel with the power transmission coil for power reception. However, if the dial side is brought close to the power transmission apparatus, the dial is not visible during the power reception operation. The back lid of a watch is often made of a metal such as stainless steel. If the metal-made back lid side is brought close to the power transmission apparatus for power transfer, eddy currents occur in the back lid and power reception cannot be performed efficiently. Some types of watchbands are not configured so that the buckle portion is fully separable, and such watches may not be able to be placed flat with the back lid side down. As a result, there has thus been a problem that the power reception coil is difficult to arrange in parallel with the power transmission coil for power reception.

To solve the foregoing problem, an object of the present invention is to provide a power transmission apparatus and a power transfer system which can perform efficient power transfer regardless of a relative arrangement between the power reception coil and the power transmission coil.

A power transmission apparatus according to the present invention is a power transmission apparatus for transmitting power to a power reception coil without contact, the power transmission apparatus including: a driving circuit; a first power transmission coil that is driven by the driving circuit; a second power transmission coil that is arranged outside the first power transmission coil; a third power transmission coil that is arranged inside the first power transmission coil; and a switching circuit that performs connection switching so that the first power transmission coil is connected to either one of the second and third power transmission coils.

Another power transmission apparatus according to the present invention is a power transmission apparatus for transmitting power to a power reception coil without contact, the power transmission apparatus including: a first power transmission coil having a planar shape; and a second power transmission coil having a planar shape, arranged outside the first power transmission coil, wherein the second power transmission coil has an opening with a diameter greater than that of an opening of the first power transmission coil in a direction of a line of intersection on which a plane including a coil plane of the first power transmission coil and a plane including a coil plane of the second power transmission coil intersect with each other.

Yet another power transmission apparatus according to the present invention is a power transmission apparatus for transmitting power to a power reception coil without contact, the power transmission apparatus including: a first power transmission coil having a planar shape, arranged so that a coil plane thereof lies in a first plane; and a second power transmission coil having a planar shape, arranged outside the first power transmission coil so that a coil plane thereof lies in a second plane that forms an angle φ (0°<φ<180°) with respect to the first plane.

A power transfer system according to the present invention includes: a first power transmission coil having a planar shape; a second power transmission coil having a planar shape, arranged outside the first power transmission coil; and a power reception coil having a planar shape, arranged out of contact with the first power transmission coil and the second power transmission coil, wherein the second power transmission coil has an opening with a diameter greater than that of an opening of the first power transmission coil, and the power reception coil has an opening with a diameter intermediate between that of the opening of the first power transmission coil and that of the opening of the second power transmission coil, in a direction of a line of intersection on which a plane including a coil plane of the first power transmission coil and a plane including a coil plane of the second power transmission coil intersect with each other.

According to the present invention, a power transmission apparatus and a power transfer system which can perform efficient power transfer regardless of a relative arrangement between the power reception coil and the power transmission coils can be provided.

BRIEF DESCRIPTION OF THE DRAWINGS

Features of the present invention will be described below with reference to the accompanying drawings.

FIG. 1A is a diagram showing a configuration of a power transmission apparatus according to Embodiment 1, FIG. 1C is a diagram showing a configuration of a power transfer system, and FIGS. 1B and 1D are diagrams schematically showing lines of magnetic force of an alternating magnetic field occurring during power transmission;

FIG. 7 is a diagram showing an example of a determination table stored in a reference value storage unit;

DETAILED DESCRIPTION OF THE INVENTION

Embodiments of the present invention will be described in detail below with reference to the drawings.

[Embodiment 1]

FIG. 1A is a diagram schematically showing power transmission coils included in a power transmission apparatus 10 according to the present invention and lines of magnetic force of an alternating magnetic field that occurs during power transmission. The power transmission apparatus 10 transfers electric power to a power reception coil without contact (i.e., contactless or wireless power transmission). The power transmission apparatus 10 includes a first power transmission coil 11 and a second power transmission coil 12.

The first power transmission coil 11 and the second power transmission coil 12 are plane coils or planar coils formed by deforming a conductive wire into a helical shape, a spiral shape, or the like on a plane. In the following description, a surface or plane formed by a plane coil or planar coil will be referred to as a coil plane. As employed herein, a plane coil or planar coil refers to not only a perfectly flat one, but also one having a height according to the thickness of the conductive wire and one having a thickness (height) capable of planar arrangement.

For example, the first power transmission coil 11 and the second power transmission coil 12 have a generally rectangular annular coil shape. The second power transmission coil 12 is arranged outside the first power transmission coil 11 so that its coil plane lies in the same plane as the coil plane of the first power transmission coil 11 does. The first power transmission coil 11 and the second power transmission coil 12 are preferably arranged or placed so as not to be interlinked with each other. The first power transmission coil 11 and the second power transmission coil 12 are driven by a driving circuit 15. When seen in a direction perpendicular to the coil plane of the first power transmission coil 11 and the second power transmission coil 12, or equivalently, in a top view, a current flows through the first power transmission coil 11 and the second power transmission coil 12 in opposite directions (for example, counterclockwise and clockwise directions) during electric power transmission.

Figure 2A:
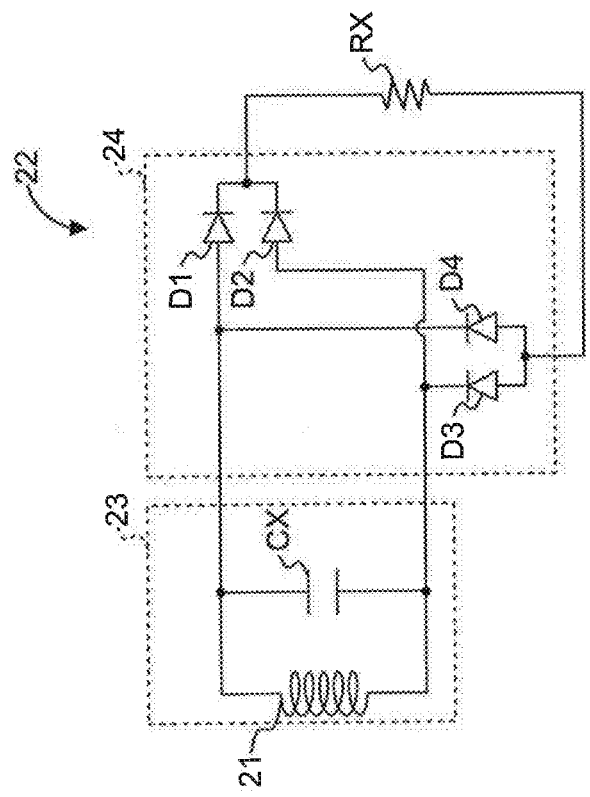
FIG. 2A is a diagram showing a configuration of a power transmission circuit.

FIG. 2A is a circuit diagram showing a configuration of a power transmission circuit 13 including the first power transmission coil 11 and the second power transmission coil 12. The power transmission circuit 13 includes a power transmission side resonant circuit 14, the driving circuit 15, and a power amplifier PA. The power transmission side resonant circuit 14 includes the first power transmission coil 11, the second power transmission coil 12, a first resonant capacitor C1, and a second resonant capacitor C2.

The driving circuit 15 is a driving circuit for supplying driving power to the first power transmission coil 11 and the second power transmission coil 12. For example, the driving circuit 15 includes an alternating-current current source. The driving circuit 15 generates, for example, an alternating current (or alternating-current signal) having a frequency of 13.56 MHz, which is used as a frequency band of an industry-science-medical (ISM) band, as a driving current. The power amplifier PA amplifies and supplies the generated alternating current to the power transmission side resonant circuit 14.

The power transmission side resonant circuit 14 includes the first power transmission coil 11 and the second power transmission coil 12 which are connected in series, the first resonant capacitor C1 which is connected in parallel with the first and second power transmission coils 11 and 12, and the second resonant capacitor C2 which is connected in series to the first and second power transmission coils 11 and 12. The power transmission side resonant circuit 14 resonates at a resonant frequency of 13.56 MHz and generates an alternating magnetic field.

Referring again to FIG. 1A, the resonance of the power transmission side resonant circuit 14 generates an alternating magnetic field having lines of magnetic force as shown by the broken lines from an opening (i.e., the interior of the coil through which magnetic flux passes) of the first power transmission coil 11 to an opening of the second power transmission coil 12. FIG. 1B is a diagram schematically showing cross sections of the first and second power transmission coils 11 and 12, and the lines of magnetic force of the alternating magnetic field as seen from a direction (i.e., direction X in FIG. 1A) parallel to the coil plane of the first power transmission coil 11. As shown by the broken lines, the lines of magnetic force trace semicircles from the first power transmission coil 11 to the second power transmission coil 12.

FIG. 1C is a diagram schematically showing a positional relationship between the first power transmission coil 11, the second power transmission coil 12, and a power reception coil 21 (hereinafter, these coils may be referred to collectively as a power transfer system) when the power reception coil 21 is arranged so that the coil plane of the power reception coil 21 and that of the first power transmission coil 11 are at a predetermined angle (for example, perpendicular). The power reception coil 21 is a plane coil or planar coil, and has a generally rectangular annular coil shape. For example, the power reception coil 21 is arranged inside a power reception apparatus, such as a watch, in parallel with a dial or dial face thereof.

Figure 2B:
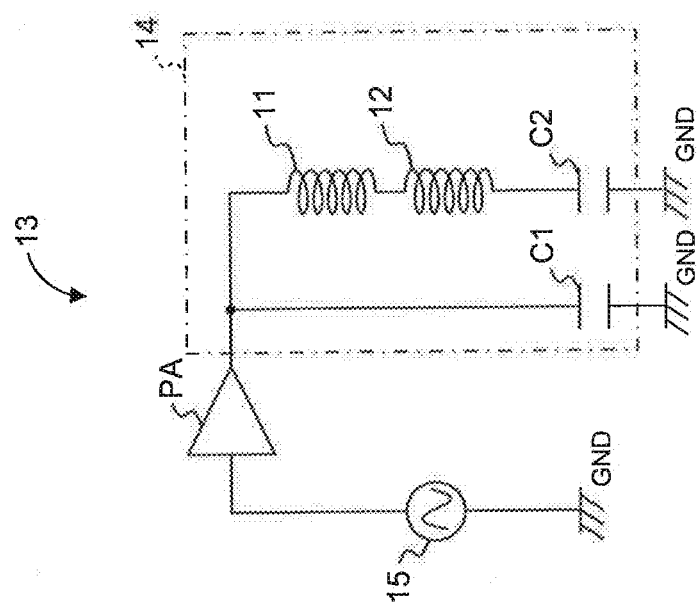
FIG. 2B is a diagram showing a configuration of a power reception circuit.

FIG. 2B is a circuit diagram showing a configuration of a power reception circuit 22 including the power reception coil 21. The power reception circuit 22 includes a power reception side resonant circuit 23, a rectifier circuit 24, and a load RX. The power reception side resonant circuit 23 includes the power reception coil 21 and a resonant capacitor CX which are connected in parallel. The rectifier circuit 24 includes rectifier diodes D1 to D4.

The power reception side resonant circuit 23 resonates at the same resonant frequency as that of the power transmission side resonant circuit 14, i.e., at a resonant frequency of 13.56 MHz, on the basis of variations of the magnetic field occurring from the resonance of the power transmission side resonant circuit 14. The power reception side resonant circuit 23 thereby generates an alternating current having a frequency of 13.56 MHz.

The power reception side resonant circuit 23 supplies the generated alternating current to the rectifier circuit 24. The rectifier circuit 24 converts the alternating current into a direct current and supplies the direct current to the load RX.

An example of the load RX is a battery provided in the power reception apparatus. In other words, by the operation of the foregoing units, power is transferred from the power transmission circuit 13 to the power reception circuit 22, and the battery of the power reception apparatus is charged.

FIG. 1D is a diagram showing a relationship between the lines of magnetic force of the alternating magnetic field generated by the power transfer system of FIG. 1C and the power reception coil 21 as seen in a direction (direction X in FIG. 1C) parallel to the coil plane of the first power transmission coil 11. With its coil plane perpendicular to the lines of magnetic force, the power reception coil 21 can capture a lot of magnetic flux.

As described above, the power transmission apparatus 10 according to the present embodiment generates the alternating magnetic field with the lines of magnetic force tracing semicircles from the opening of the first power transmission coil 11 to the opening of the second power transmission coil 12. The power reception coil 21 can thus efficiently capture magnetic flux even if the power reception coil 21 is arranged perpendicular to the first power transmission coil 11 and the second power transmission coil 12.

Figure 3B:
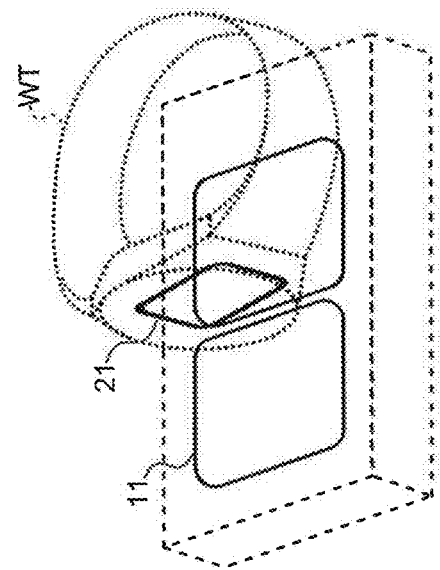
FIGS. 3A and 3B are diagrams schematically showing an example where a watch WT serving as a power reception apparatus is arranged on a housing of the power transmission apparatus.
Figure 3A:
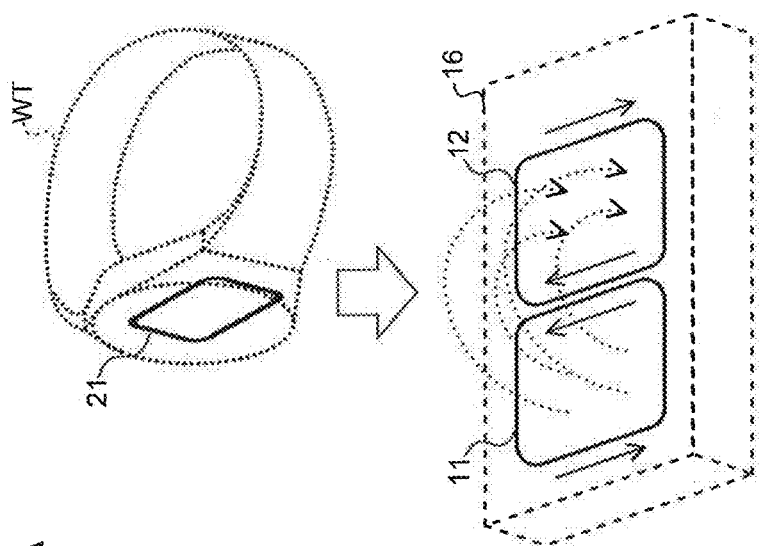

FIGS. 3A and 3B are diagrams schematically showing an example where the power reception apparatus including the power reception coil 21 is a watch WT and the watch WT is placed on a housing 16 of the power transmission apparatus 10 including the first power transmission coil 11 and the second power transmission coil 12. In such a manner, the watch WT can be placed for power reception with its dial perpendicular to the first power transmission coil 11 and the second power transmission coil 12, without being placed flat on the housing 16 of the power transmission apparatus 10 (i.e., without the dial or back lid being arranged in parallel with the top surface of the housing).

In the foregoing description, the coil plane of the power reception coil 21 and the coil plane of the first power transmission coil 11 are described to be arranged perpendicular to each other. However, the arrangement in which the power reception coil 21 can efficiently capture the magnetic flux is not limited to the perpendicular one. Since the alternating magnetic field is generated with the lines of magnetic force tracing semicircles from the first power transmission coil 11 to the second power transmission coil 12, the power reception coil 21 can efficiently capture the magnetic flux if an angle θ between the coil plane of the power reception coil 21 and the coil plane of the first power transmission coil 11 falls within the range of $0° \leq θ \leq 180°$.

In other words, according to the present invention, the power reception coil can be arranged at various angles to the power transmission coils for power reception. Efficient power transfer can be performed regardless of the relative arrangement between the power reception coil and the power transmission coils.

[Embodiment 2]

A power transmission apparatus and a power transfer system according to the present embodiment will be described with reference to FIGS. 4A to 8. A power reception coil and a power reception circuit have the same configuration as those of Embodiment 1. The same or equivalent components will be denoted by the same reference numerals, and a description thereof will be omitted.

Figure 4A:
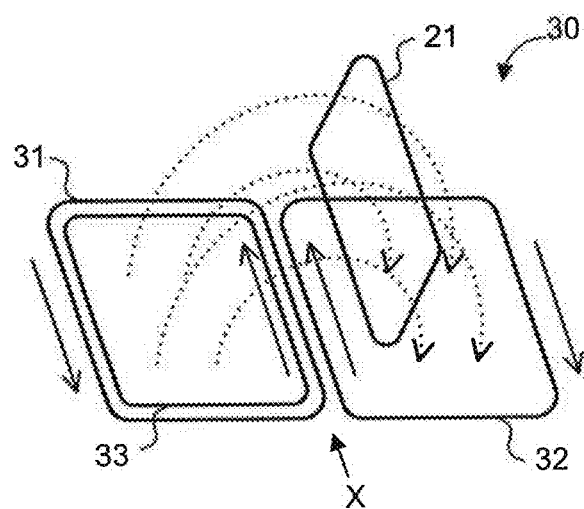
FIG. 4A is a diagram showing a configuration of a power transmission apparatus according to Embodiment 2.

FIG. 4A is a diagram schematically showing a power transmission apparatus 30 and a power transfer system (power transmission coils and a power reception coil) according to the present embodiment. The power transmission apparatus 30 includes a first power transmission coil 31, a second power transmission coil 32, and a third power transmission coil 33.

The first power transmission coil 31 and the second power transmission coil 32 are plane coils or planar coils, and arranged so that their coil planes lie in the same plane. The first power transmission coil 31 and the second power transmission coil 32 are coils having a generally rectangular annular shape. The second power transmission coil 32 is arranged outside the first power transmission coil 31. The second power transmission coil 32 is preferably arranged in a non-interlinkage manner with respect to the first power transmission coil 31.

The third power transmission coil 33 is a plane coil or planar coil, and arranged so that its coil plane lies in the same plane as the coil plane of the first power transmission coil 31 does. The third power transmission coil 33 is a coil having a generally rectangle annular shape smaller than the first power transmission coil 31. The third power transmission coil 33 is arranged inside (i.e., inside the opening of) the first power transmission coil 31.

By a switching operation of a power transmission circuit to be described later, either one of the second power transmission coil 32 and the third power transmission coil 33 is selected to generate an alternating magnetic field with the first power transmission coil 31. During power transmission using the first power transmission coil 31 and the second power transmission coil 32, a current flows through the first power transmission coil 31 and the second power transmission coil 32 in opposite directions (for example, counterclockwise and clockwise directions) when seen in a direction perpendicular to the coil planes of the first power transmission coil 31 and the second power transmission coil 32. During power transmission using the first power transmission coil 31 and the third power transmission coil 33, a current flows through the first power transmission coil 31 and the third power transmission coil 33 in the same direction (for example, both in the counterclockwise direction) when seen in a direction perpendicular to the coil planes of the first power transmission coil 31 and the third power transmission coil 33.

Figure 5:
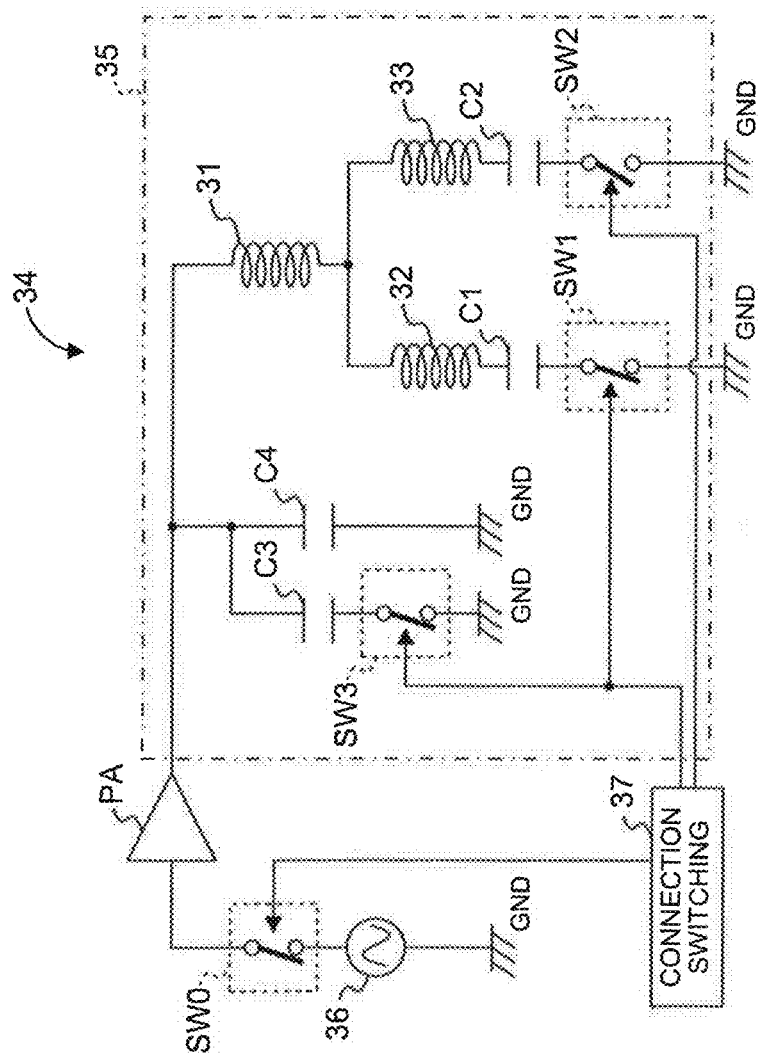
FIG. 5 is a circuit diagram showing a configuration of a power transmission circuit according to Embodiment 2.

FIG. 5 is a circuit diagram showing a configuration of a power transmission circuit 34 including the first power transmission coil 31, the second power transmission coil 32, and the third power transmission coil 33. The power transmission circuit 34 includes a power transmission side resonant circuit 35, a driving circuit 36, a power amplifier PA, and a connection switching unit 37.

The driving circuit 36 is a driving circuit for supplying driving power to the first power transmission coil 31, the second power transmission coil 32, and the third power transmission coil 33. For example, the driving circuit 36 includes an alternating-current current source. The driving circuit 36 generates, for example, an alternating current (or alternating-current signal) having a frequency of 13.56 MHz which is used as an ISM frequency band. The power amplifier PA amplifies and supplies the amplified alternating current to the power transmission side resonant circuit 35.

The driving circuit 36 and the power amplifier PA are connected via a switch SW0. The switch SW0 turns on or off according to a switching operation of the connection switching unit 37. During power transfer, the switch SW0 is controlled on and the driving circuit 36 is connected to the power amplifier PA and the first power transmission coil 31. When the power transfer is stopped, the switch SW0 is controlled off and the driving circuit 36 is disconnected from the power amplifier PA and the first power transmission coil 31.

The power transmission side resonant circuit 35 includes the first power transmission coil 31, the second power transmission coil 32, the third power transmission coil 33, a first resonant capacitor C1, a second resonant capacitor C2, a third resonant capacitor C3, and a fourth resonant capacitor C4.

The second power transmission coil 32 and the first resonant capacitor C1 are connected to a ground potential via a switch SW1. When the switch SW1 is on, the second power transmission coil 32 and the first resonant capacitor C1 are connected to the ground potential and are connected in series to the driving circuit 36 and the first power transmission coil 31. When the switch SW1 is off, the second power transmission coil 32 and the first resonant capacitor C1 are disconnected from the ground potential and become electrically floating.

The third power transmission coil 33 and the second resonant capacitor C2 are connected to the ground potential via a switch SW2. When the switch SW2 is on, the third power transmission coil 33 and the second resonant capacitor C2 are connected to the ground potential and are connected in series to the driving circuit 36 and the first power transmission coil 31. When the switch SW2 is off, the third power transmission coil 33 and the second resonant capacitor C2 are disconnected from the ground potential and become electrically floating.

The switches SW1 and SW2 turn on or off in a complementary manner according to a switching operation of the connection switching unit 37. In other words, the first power transmission coil 31 is connected to the ground potential either via the second power transmission coil 32 and the first resonant capacitor C1 or via the third power transmission coil 33 and the second resonant capacitor C2.

The third resonant capacitor C3 is connected to the ground potential via a switch SW3. When the switch SW3 is on, the third resonant capacitor C3 is connected to the ground potential and is connected in parallel with the first power transmission coil 31. When the switch SW3 is off, the third resonant capacitor C3 is disconnected from the ground potential and becomes electrically floating. The fourth resonant capacitor C4 is connected in parallel with the first power transmission coil 31 and is connected to the ground potential.

The connection switching unit 37 is a switching circuit for switching the switches SW0, SW1, SW2, and SW3 on or off. The connection switching unit 37 turns on or off the switches SW1 and SW3 into the same state. The connection switching unit 37 turns on or off the switches SW1 and SW2 in a complementary manner. The switches SW1, SW2, and SW3 are thus operated in either a state (i.e., first state) in which SW1 and SW3 are on and SW2 is off or in a state (i.e., second state) in which SW1 and SW3 are off and SW2 is on.

In the foregoing first state (i.e., the switches SW1 and SW3 are on and the switch SW2 is off), the first power transmission coil 31, the second power transmission coil 32, and the first resonant capacitor C1 are connected in series. The third resonant capacitor C3 and the fourth resonant capacitor C4 are connected in parallel. The resulting circuit configuration of the power transmission side resonant circuit 35 includes the first power transmission coil 31, the second power transmission coil 32, and the first resonant capacitor C1 which are connected in series to the driving circuit 36 via the power amplifier PA, and the third resonant capacitor C3 and the fourth resonant capacitor C4 which are connected in parallel.

On the other hand, in the foregoing second state (i.e., the switches SW1 and SW3 are off and the switch SW2 is on), the first power transmission coil 31, the third power transmission coil 33, and the second resonant capacitor C2 are connected in series. The fourth resonant capacitor C4 is connected thereto in parallel. The resulting circuit configuration of the power transmission side resonant circuit 35 includes the first power transmission coil 31, the second power transmission coil 32, and the first resonant capacitor C1 which are connected in series to the driving circuit 36 via the power amplifier PA, and the fourth resonant capacitor C4 which is connected in parallel.

As described above, the connection switching unit 37 switches and connects the first power transmission coil 31 to either one of the second and third power transmission coils 32 and 33 by the switching operations of the switches SW1 to SW3.

Figure 4B:
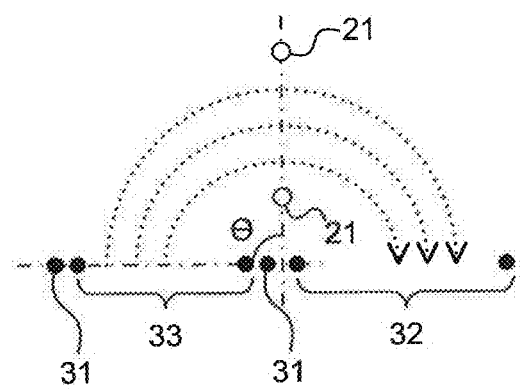
FIGS. 4B and 4C are diagrams schematically showing the lines of magnetic force of an alternating magnetic field occurring during power transmission.

When the first power transmission coil 31 is connected to the second power transmission coil 32, as shown by broken lines in FIG. 4B, the lines of magnetic force of the alternating magnetic field generated by the power transmission circuit 34 trace semicircles from the opening of the first power transmission coil 31 to the opening of the second power transmission coil 32. The power reception coil 21 can thus capture a lot of magnetic flux if, for example, the angle formed between the coil plane of the power reception coil 21 and the coil planes of the first and second power transmission coils 31 and 32 is perpendicular or close to perpendicular.

Figure 4C:
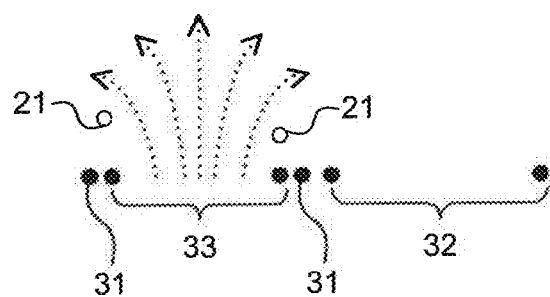

On the other hand, if the first power transmission coil 31 is connected to the third power transmission coil 33, as shown by broken lines in FIG. 4C, the lines of magnetic force of the alternating magnetic field generated by the power transmission circuit 34 pass through the opening of the first power transmission coil 31 and the opening of the third power transmission coil 33. The power reception coil 21 can thus capture a lot of magnetic flux if, for example, the angle formed between the coil plane of the power reception coil 21 and the coil plane of the first power transmission coil 31 is close to parallel.

According to such a configuration, the connection of the first power transmission coil 31 can be selectively switched between the second power transmission coil 32 and the third power transmission coil 33 as described above for efficient power reception, depending on the state of arrangement or placement of the power reception coil 21. The connection switching can be performed, for example, by the user or the like operating the connection switching unit 37 to turn on or off the switches SW1, SW2, and SW3.

The connection switching unit 37 may be configured to automatically switch the connection without the user's operation. For example, the connection switching unit 37 may be configured to measure a current value of the current flowing through or a voltage value of the voltage across the coil section of the power transmission circuit 34, i.e., the first and second power transmission coils 31 and 32 or the first and third power transmission coils 31 and 33 (hereinafter, correctively referred to simply as power transmission coils), and switch the connection according to the measurement result. More specifically, the power reception coil 21 can capture more magnetic flux if the magnetic field coupling between the power reception coil 21 and the power transmission coils is strong. The driving current and the driving voltage for driving the power transmission coils vary in value according to the strength of the magnetic field coupling. The current value or voltage value is thus measured to determine whether the magnetic field coupling is strong (whether the power reception coil 21 is in a state of arrangement in which a lot of magnetic flux can be captured) and switch the connection.

Figure 6:
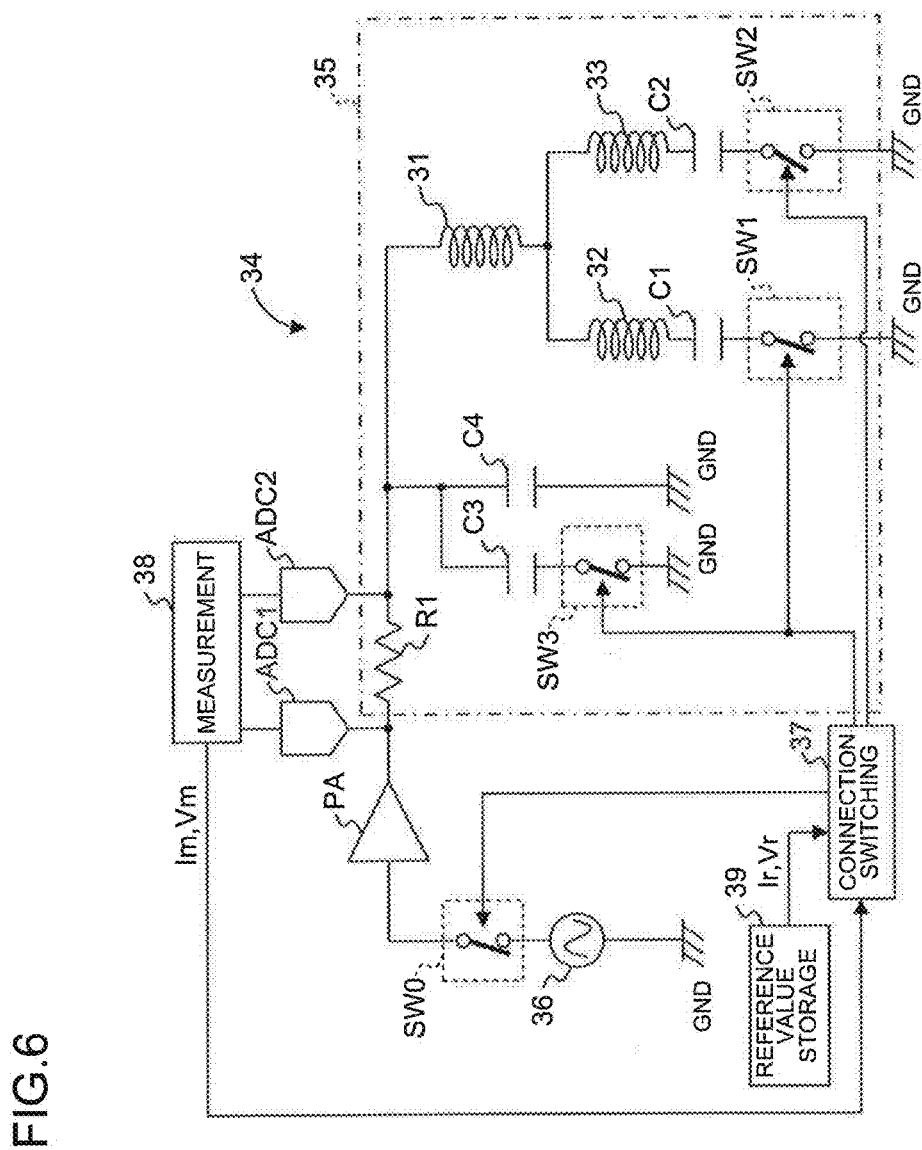
FIG. 6 is a circuit diagram showing a configuration of a power transmission circuit with an automatic switching function.
Figure 8:
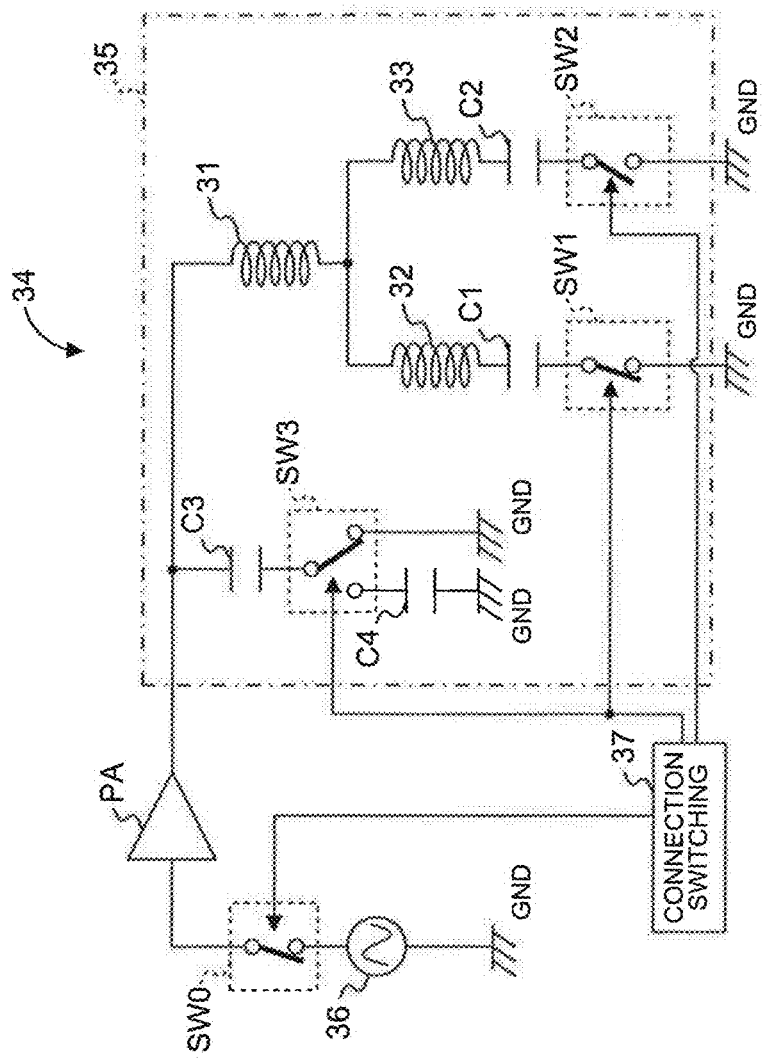
FIG. 8 is a circuit diagram showing another configuration of the power transmission circuit according to Embodiment 2.

FIG. 6 is a diagram showing a configuration of the power transmission circuit 34 configured to be capable of such automatic switching. The power transmission circuit 34 of FIG. 6 includes a resistor R1, voltage conversion units ADC1 and ADC2, a measurement unit 38, and a reference value storage unit 39 in addition to the configuration shown in FIG. 5.

The resistor R1 is connected between the power amplifier PA and a connection point of the first power transmission coil 31 and the fourth resonant capacitor C4. The voltage conversion units ADC1 and ADC2 are connected to the respective ends of the resistor R1. The voltage conversion units ADC1 and ADC2 convert the alternating-current voltages at both ends of the resistor R1 into direct-current voltages and supply the direct-current voltages to the measurement unit 38.

The measurement unit 38 measures the value (i.e., direct-current voltage value) of the voltage across the resistor R1, supplied from the voltage conversion units ADC1 and ADC2. On the basis of the measured voltage value and the resistance value of the resistor R1, the measurement unit 38 determines the amount of the current flowing through the resistor R1 as the current value of the driving current for driving the power transmission coils. The measurement unit 38 supplies the voltage value and the current value to the connection switching unit 37 as a voltage measurement value Vm and a current measurement value Im.

The reference value storage unit 39 stores a determination table including reference values for determining which connection switching provides a stronger magnetic field coupling with respect to the connection of the first power transmission coil 31 to the second power transmission coil 32 or to the third power transmission coil 33.

FIG. 7 is a diagram showing an example of the determination table stored in the reference value storage unit 39. The determination table stores previously-measured voltage values and current values of the resistor R1 as reference voltage values Vr and reference current values Ir in association with a positional relationship between the power reception coil 21 and the first power transmission coil 31.

In FIG. 7, Vr1(0) and Ir1(0) are the reference voltage value and the reference current value when the coil plane of the power reception coil 21 and the coil plane of the first power transmission coil 31 are parallel to each other (i.e., the angle θ formed between the coil planes is 0°) in the first state (i.e., the switches SW1 and SW3 are on and the switch SW2 is off). Similarly, Vr1(90) and Ir1(90) are the reference voltage value and the reference current value when the coil plane of the power reception coil 21 and the coil plane of the first power transmission coil 31 are perpendicular to each other (i.e., the angle θ formed between the coil planes is 90°). Vr1(45) and Ir1(45) are the reference voltage value and the reference current value when the angle θ formed between the coil plane of the power reception coil 21 and the coil plane of the first power transmission coil 31 is 45°.

In FIG. 7, Vr2(0) and Ir2(0) are the reference voltage value and the reference current value when the coil plane of the power reception coil 21 and the coil plane of the first power transmission coil 31 are parallel to each other (i.e., the angle θ is 0°) in the second state (i.e., the switches SW1 and SW3 are off and the switch SW2 is on). Similarly, Vr2(90) and Ir2(90) are the reference voltage value and the reference current value when the coil plane of the power reception coil 21 and the coil plane of the first power transmission coil 31 are perpendicular to each other (i.e., the angle θ is 90°). Vr2(45) and Ir2(45) are the reference voltage value and the reference current value when the angle θ formed between the coil plane of the power reception coil 21 and the coil plane of the first power transmission coil 31 is 45°.

Further, Vr1($x$) and Ir1($x$), and Vr2($x$) and Ir2($x$), represent the reference values of the voltage value and the current value at an arrangement position limit where the power reception coil 21 can receive a certain or higher level of power. In other words, these reference values indicate the limit values of the voltage value and the current value below which sufficient power is not able to be transferred.

The connection switching unit 37 determines the positional relationship between the power reception coil 21 and the first power transmission coil 31 and switches the connection on the basis of the voltage measurement value Vm and the current measurement value Im supplied from the measurement unit 38 and the reference voltage values Vr and the reference current values Ir stored in the determination table of the reference value storage unit 39.

For example, suppose that in the first state (i.e., the switches SW1 and SW3 are on and the switch SW2 is off), the voltage measurement value Vm and the current measurement value Im are closer to Vr1(0) and Ir1(0) than to Vr1(90) and Ir1(90). In such a case, the connection switching unit 37 determines that the angle formed between the coil plane of the power reception coil 21 and the coil plane of the first power transmission plane 31 is closer to parallel, and switches the connection to the second state (i.e., the switches SW1 and SW3 are off and the switch SW2 is on). On the other hand, if the voltage measurement value Vm and the current measurement value Im are closer to Vr1(90) and Ir1(90), the connection switching unit 37 determines that the angle formed between the coil plane of the power reception coil 21 and the coil plane of the first power transmission coil 31 is closer to perpendicular, and does not switch the connection.

Suppose that in the second state (i.e., the switch SW2 is on and the switches SW1 and SW3 are off), the voltage measurement value Vm and the current measurement value Im are closer to Vr2(90) and Ir2(90) than to Vr2(0) and Ir2(0). In such a case, the connection switching unit 37 determines that the angle formed between the coil plane of the power reception coil 21 and the coil plane of the first power transmission plane 31 is closer to perpendicular, and switches the connection to the first state (i.e., the switches SW1 and SW3 are on and the switch SW2 is off). On the other hand, if the voltage measurement value Vm and the current measurement value Im are closer to Vr2(0) and Ir2(0), the connection switching unit 37 determines that the angle formed between the coil plane of the power reception coil 21 and the coil plane of the first power transmission coil 31 is closer to parallel, and does not switch the connection.

If, in the first state, the voltage measurement value Vm and the current measurement value Im fall below $Vr1(x)$ and $Ir1(x)$, or if, in the second state, the voltage measurement value Vm and the current measurement value Im fall below $Vr2(x)$ and $Ir2(x)$, the connection switching unit 37 determines that the power reception coil 21 is not located in a position capable of transferring a certain or higher level of power (for example, the power reception coil 21 is located far from the first power transmission coil 31). The connection switching unit 37 then turns off the switch SW0. This stops the power transmission by the power transmission circuit 34.

Consequently, according to the power transmission circuit 34 having the configuration of FIG. 6, whether the power reception coil 21 is in a state of arrangement capable of capturing more magnetic flux can be determined and the connection of the first power transmission coil 31 can be automatically connected to the second power transmission coil 32 or the third power transmission coil 33 on the basis of the measurement values of the voltage and the current across the resistor R1.

In the foregoing description, the connection switching is described to be performed on the basis of both the voltage measurement value and the current measurement value. However, the connection switching may be performed by using either one of the voltage measurement value and the current measurement value.

As described above, according to the power transmission apparatus 30 of the present embodiment, the connection of the coils on the power transmission side can be switched to perform efficient power transfer according to the state of arrangement of the power reception coil 21.

The power transmission side resonant circuit 35 of the power transmission circuit 34 is not limited to the circuit configurations shown in FIGS. 5 and 6. For example, the power transmission side resonant circuit 35 may have the circuit configuration shown in FIG. 8. Specifically, unlike the power transmission side resonant circuit 35 shown in FIG. 5, the switch SW3 arranged in connection with the third resonant capacitor C3 switches the connection of the third resonant capacitor C3 to either one of the fourth resonant capacitor C4 and the ground potential. When the third resonant capacitor C3 and the fourth resonant capacitor C4 are connected by the switch SW3, the third resonant capacitor C3 is connected to the ground potential via the fourth resonant capacitor C4. When the third resonant capacitor C3 and the ground potential are connected by the switch SW3, the third resonant capacitor C3 is connected to the ground potential without the intervention of the fourth resonant capacitor C4. Even in such a configuration, the connection of the first power transmission coil 31 can be selectively switched to the second power transmission coil 32 or the third power transmission coil 33 for efficient power transfer according to the state of arrangement of the power reception coil 21 by switching the switch SW3 in association with the switching of the switches SW1 and SW2.

[Embodiment 3]

A power transmission apparatus and a power transfer system according to the present embodiment will be described with reference to FIG. 9. The configuration of the power transmission circuit, the power reception circuit, and the power reception coil is the same as that in the first embodiment. Such components are denoted by the same reference numerals, and a description thereof will be omitted.

Figure 9A:
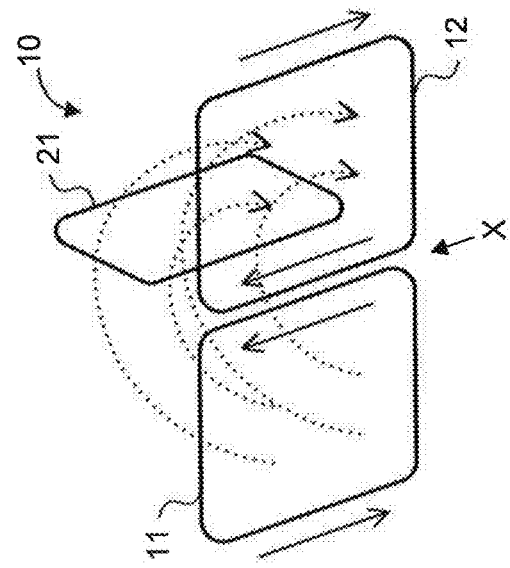
FIG. 9A is a diagram showing a configuration of power transmission coils and a power reception coil according to Embodiment 3.

FIG. 9A is a diagram schematically showing a power transmission apparatus 40 and a power transfer system (power transmission coils and a power reception coil) according to the present embodiment. The power transmission apparatus 40 includes a first power transmission coil 41 and a second power transmission coil 42. FIG. 9A shows an example in which the power reception coil 21 is arranged so that the angle formed between the coil plane of the power reception coil 21 and the coil plane of the first power transmission coil 41 is perpendicular.

The first power transmission coil 41 and the second power transmission coil 42 are plane coils or planar coils. The first power transmission coil 41 and the second power transmission coil 42 are arranged so that the planes including their respective coil planes form a predetermined angle $\phi$ ($0°<\phi<180°$). More specifically, the first power transmission coil 41 is arranged with its coil plane in a first plane. The second power transmission coil 42 is arranged with its coil plane in a second plane which forms the predetermined angle $\phi$ with respect to the first plane. An alternating magnetic field occurs with lines of magnetic force that trace arcs shown by the broken lines from the opening of the first power transmission coil 41 to the opening of the second power transmission coil 42.

Figure 9B:
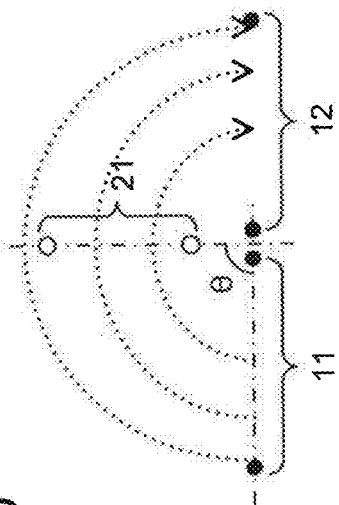
FIG. 9B is a diagram schematically showing the lines of magnetic force of an alternating magnetic field occurring during power transmission.
Figure 9C:
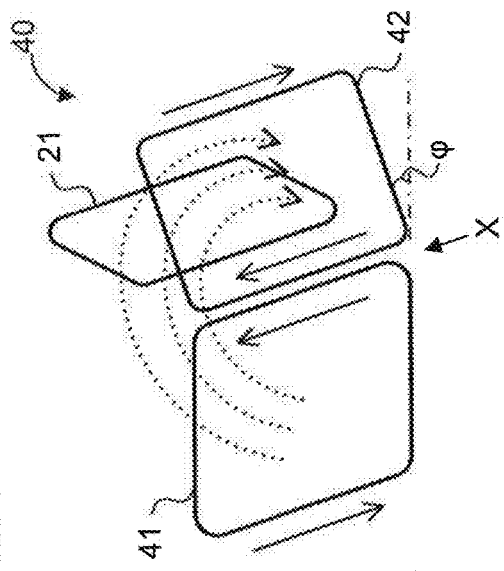
FIG. 9C is a diagram showing the configuration of the power transmission coils and the power reception coil according to Embodiment 1 for the sake of comparison.
Figure 9D:
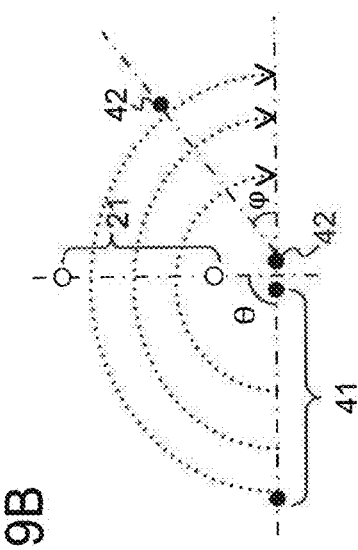
FIG. 9D is a diagram schematically showing the lines of magnetic force of the alternating magnetic field occurring during power transmission according to Embodiment 1 for the sake of comparison.

FIG. 9B is a diagram showing the lines of magnetic force of the alternating magnetic field as seen in a direction (direction X in FIG. 9A) parallel to the coil plane of the first power transmission coil 41. FIGS. 9C and 9D are diagrams for the sake of comparison, showing an example of the lines of magnetic force of the alternating magnetic field and the power reception coil 21 when the coil plane of the first power transmission coil and the coil plane of the second power transmission coil are located in the same plane like those in Embodiment 1.

In the present embodiment, the angle formed between the coil plane of the first power transmission coil 41 and the coil plane of the second power transmission coil 42 is $\phi$ ($0°<\phi<180°$). As shown by the broken lines in FIG. 9B, the spreading of the lines of magnetic force of the alternating magnetic field is smaller than that of the lines of magnetic force of the alternating magnetic field (FIG. 9D) when the coil planes of the first power transmission coil 41 and the second power transmission coil 42 are in the same plane. In other words, the alternating magnetic field generated by the first power transmission coil 41 and the second power transmission coil 42 according to the present embodiment has a magnetic flux density higher than that of the alternating magnetic field generated when the coil plane of the first power transmission coil and the coil plane of the second power transmission coil are in the same plane like Embodiment 1. The power reception coil 21 can thus capture a lot of magnetic flux.

As described above, according to the power transmission apparatus 40 of the present embodiment, an alternating magnetic field having a higher magnetic flux density is generated. This enables efficient power transfer.

In the foregoing description, the coil plane of the power reception coil 21 and the coil plane of the first power transmission coil 41 are described to be arranged perpendicular to each other. However, the arrangement in which the power reception coil 21 can efficiently capture magnetic flux is not limited to the perpendicular one. The power reception coil 21 can efficiently capture magnetic flux if the angle θ between the coil plane of the power reception coil 21 and the coil plane of the first power transmission coil 41 falls within the range of $0° \leq \theta \leq 180°$, since the alternating magnetic field of which the lines of magnetic force from the first power transmission coil 41 to the second power transmission coil 42 are less spreading is generated.

[Embodiment 4]

A power transmission apparatus and a power transfer system according to the present embodiment will be described with reference to FIGS. 10A to 14. The configuration of the power transmission circuit and the power reception circuit is the same as in Embodiment 1. Such components are denoted by the same reference numerals, and a description thereof will be omitted.

Figure 10A:
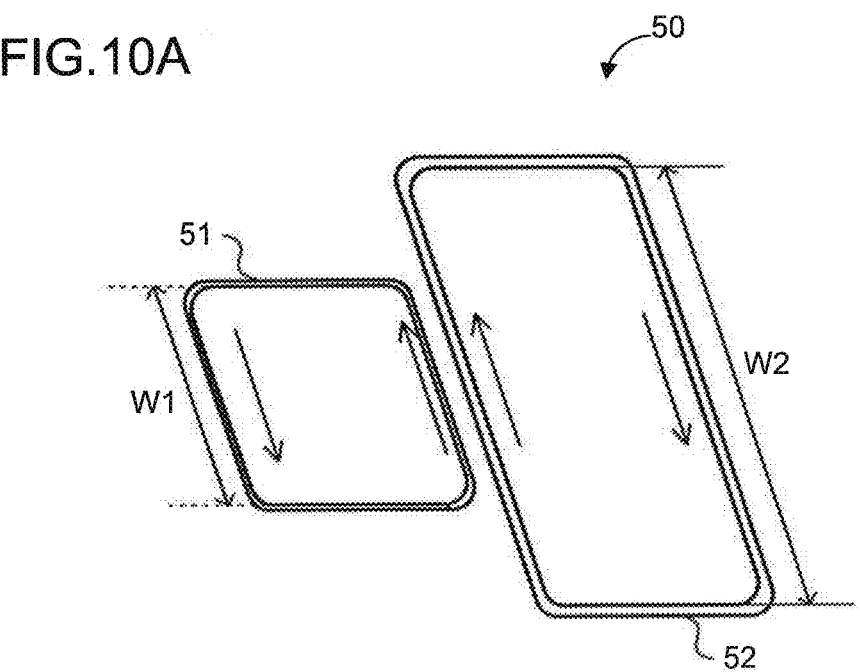
FIG. 10A is a diagram showing a configuration of a power transmission apparatus according to Embodiment 4.

FIG. 10A is a diagram schematically showing a configuration of power transmission coils of a power transmission apparatus 50 according to the present embodiment. The power transmission apparatus 50 includes a first power transmission coil 51 and a second power transmission coil 52.

The first power transmission coil 51 and the second power transmission coil 52 are plane coils or planar coils. The first power transmission coil 51 and the second power transmission coil 52 have a generally rectangular annular coil shape each, and are juxtaposed in the same plane. During power transmission, a current flows through the first power transmission coil 51 and the second power transmission coil 52 in opposite directions (for example, counterclockwise and clockwise directions) when seen in a direction perpendicular to the coil plane of the first power transmission coil 51 and the second power transmission coil 52.

The opening of the second power transmission coil 52 has a diameter greater than that of the opening of the first power transmission coil 51 in a direction perpendicular to the direction in which the first power transmission coil 51 and the second power transmission coil 52 are juxtaposed. More specifically, the diameter (i.e., inner diameter, denoted by W2 in the diagram) of the opening of the second power transmission coil 52 is greater than the diameter (i.e., denoted by W1 in the diagram) of the opening of the first power transmission coil 51. As employed herein, an opening refers to a portion (i.e., inner diameter portion) where magnetic flux passes inside the coil.

Figure 10B:
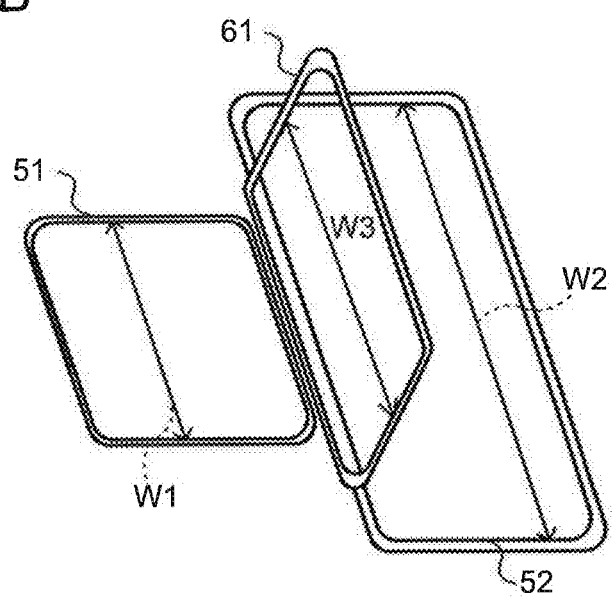
FIG. 10B is a diagram showing a configuration of a power transfer system.

FIG. 10B is a diagram schematically showing a positional relationship between the first power transmission coil 51, the second power transmission coil 52, and a power reception coil 61 (power transfer system) when the power reception coil 61 is arranged so that the coil plane of the power reception coil 61 and the coil plane of the first power transmission coil 51 are at a predetermined angle (for example, perpendicular).

The power reception coil 61 is a plane coil or planar coil, and has a generally rectangular annular coil shape. The opening of the power reception coil 61 has a diameter (denoted by W3 in the diagram) greater than the diameter W1 of the opening of the first power transmission coil 51 and smaller than the diameter W2 of the opening of the second power transmission coil 52. In other words, the opening of the power reception coil 61 has a diameter intermediate between that of the opening of the first power transmission coil 51 and that of the opening of the second power transmission coil 52.

Figure 11A:
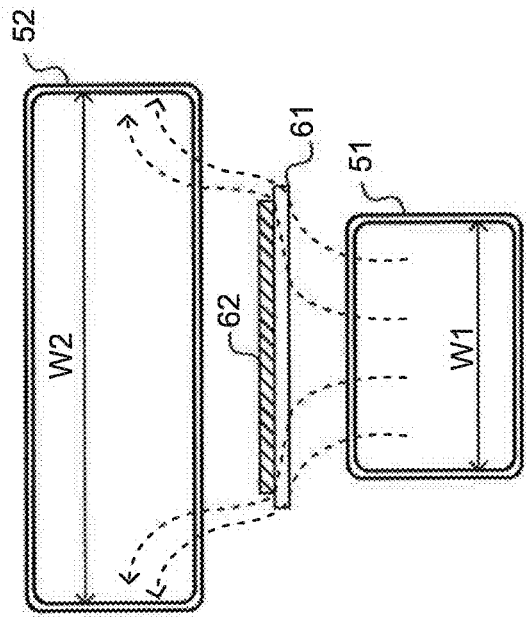
FIG. 11A is a diagram showing the lines of magnetic force of the magnetic field generated by the power transmission apparatus according to Embodiment 4 in a case where the power reception apparatus does not include a magnetic material sheet.
Figure 11B:
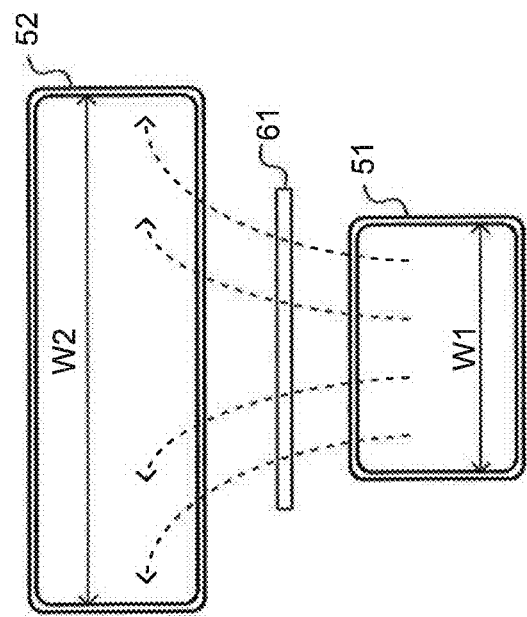
FIG. 11B is a diagram showing the lines of magnetic force of the magnetic field generated by the power transmission apparatus according to Embodiment 4 in a case where the power reception apparatus includes a magnetic material sheet.

For example, the power reception coil 61 is arranged inside a power reception apparatus, such as a watch, in parallel with a dial thereof. A magnetic material sheet may be provided on the backside of the power reception surface (i.e., the surface on the first power transmission coil 51 side) of the power reception coil 61 (i.e., the surface on the second power transmission coil 52 side). FIGS. 11A and 11B are diagrams schematically showing the lines of magnetic force of an alternating magnetic field as seen in a direction perpendicular to the coil plane of the first power transmission coil 51. FIG. 11A shows a case in which no magnetic material sheet is provided. FIG. 11B shows a case in which a magnetic material sheet is provided.

When there is provided no magnetic material sheet, as shown by the broken-lined arrows in FIG. 11A, an alternating magnetic field is generated so that the lines of magnetic force extend from the opening of the first power transmission coil 51 to the opening of the second power transmission coil 52 through the power reception coil 61.

When a magnetic material sheet 62 is provided on the backside (or rear surface) of the power reception surface of the power reception coil 61, as shown by the broken-lined arrows in FIG. 11B, an alternating magnetic field is generated so that the lines of magnetic force extend from the opening of the first power transmission coil 51 to the opening of the second power transmission coil 52 through end portions of the power reception coil 61 to circumvent the magnetic material sheet 62. Since the opening of the second power transmission coil 52 is formed to have the diameter W2 greater than the diameter W1 of the opening of the first power transmission coil 51, the lines of magnetic force of the alternating magnetic field can reach the opening of the second power transmission coil 52 despite the provision of the magnetic material sheet 62 on the backside of the power reception surface of the power reception coil 61.

As described above, according to the power transmission apparatus 50 of the present embodiment, the opening of the second power transmission coil 52 is formed to have the diameter W2 greater than the diameter W1 of the opening of the first power transmission coil 51. Even if the magnetic material sheet 62 is provided on the backside of the power reception surface of the power reception coil 61, power transfer can thus be performed without interrupting the alternating magnetic field.

The first power transmission coil 51, the second power transmission coil 52, and the power reception coil 61 are not limited to the generally rectangular coil shapes, and may have arbitrary annular coil shapes. The first power transmission coil 51 and the second power transmission coil 52 are not limited to the foregoing juxtaposition on the same plane. As in Embodiment 3, the first and second power transmission coils 51 and 52 may be arranged so that their coil planes form a predetermined angle φ ($0° < \phi < 180°$).

Figure 12:
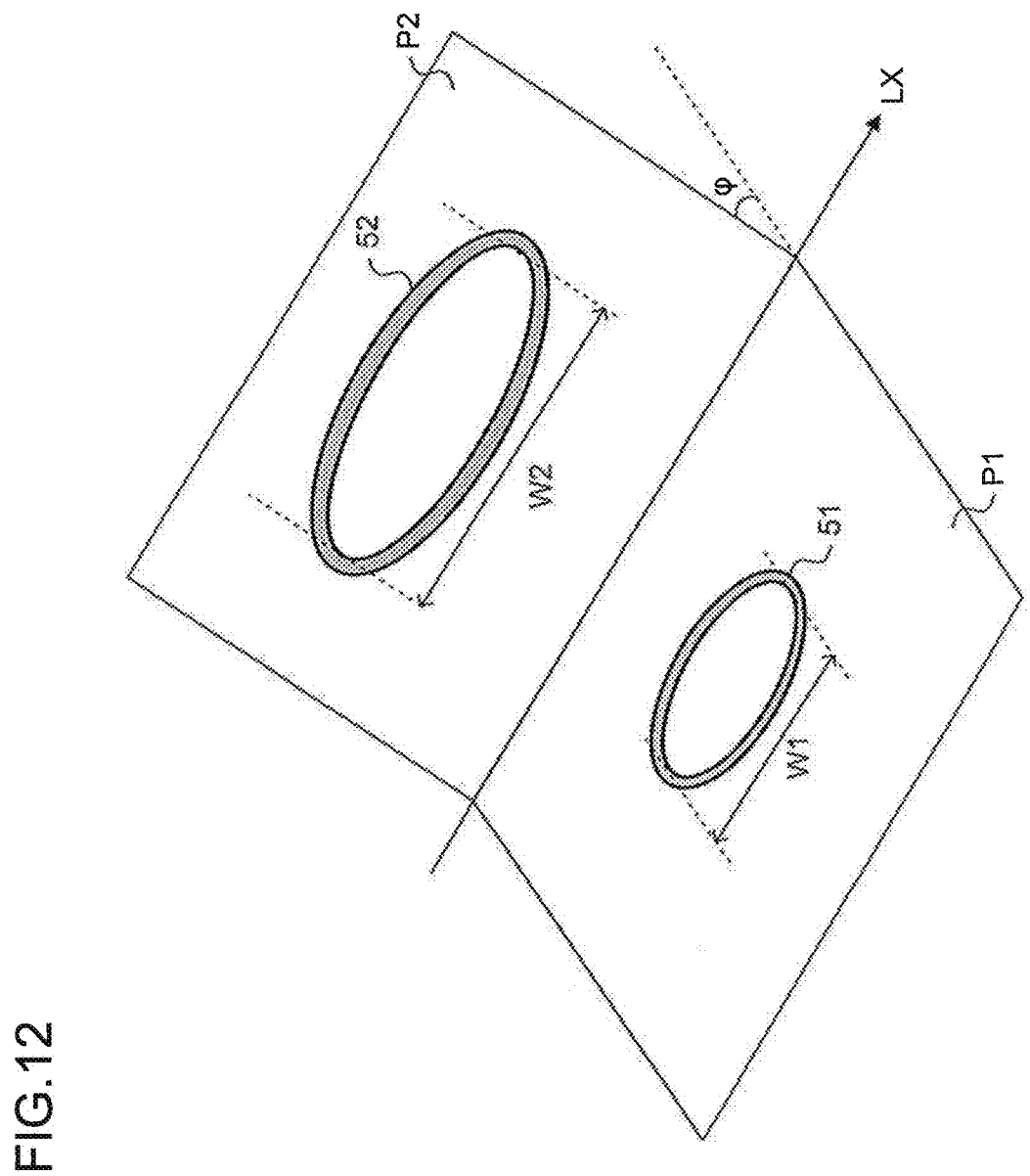
FIG. 12 is a diagram showing an example where the coil planes of the first and second power transmission coils form a predetermined angle in Embodiment 4.

FIG. 12 is a diagram schematically showing an example in which the coil plane of the first power transmission coil 51 and the coil plane of the second power transmission coil 52 form an angle φ. The plane including the coil plane of the first power transmission coil 51 will be referred to as a plane P1. The plane including the coil plane of the second power transmission coil 52 will be referred to as a plane P2. In a direction LX that is the direction of the line of intersection on which the plane P1 and the plane P2 intersect with each other, the opening of the second power transmission coil 52 has a diameter W2 greater than the diameter W1 of the opening of the first power transmission coil 51.

As described above, the coil planes of the respective first and second power transmission coils 51 and 52 may be arranged to lie in the same plane or form a predetermined angle φ. Regardless of which is the case, the opening of the second power transmission coil 52 may have a diameter greater than that of the opening of the first power transmission coil 51 in the direction of the line of intersection on which the plane including the coil plane of the first power transmission coil 51 and the plane including the coil plane of the second power transmission coil 52 intersect with each other.

Figure 13:
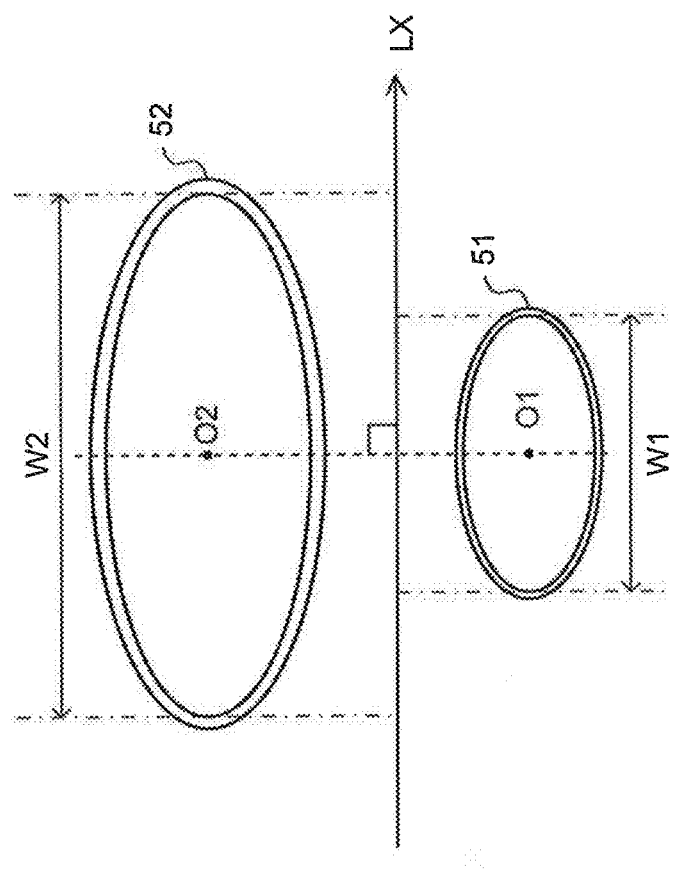
FIG. 13 is a diagram showing an example where the first and second power transmission coils have a rotationally symmetrical annular coil shape in Embodiment 4.

FIG. 13 is a diagram showing a positional relationship between the first and second power transmission coils and the direction of intersection LX when the first and second power transmission coils have rotationally symmetrical annular shapes such as circular shapes, including ellipses, and polygonal shapes. The first power transmission coil 51 and the second power transmission coil 52 have rotationally symmetrical annular shapes such as circular shapes, including ellipses, and polygonal shapes, and their openings also have rotationally symmetrical annular shapes. The center of rotation of the first power transmission coil 51 will be denoted by O1. The center of rotation of the second power transmission coil 52 will be denoted by O2. The first power transmission coil 51 and the second power transmission coil 52 are arranged so that the straight line connecting O1 and O2 is perpendicular to the direction of intersection LX.

Figure 14:
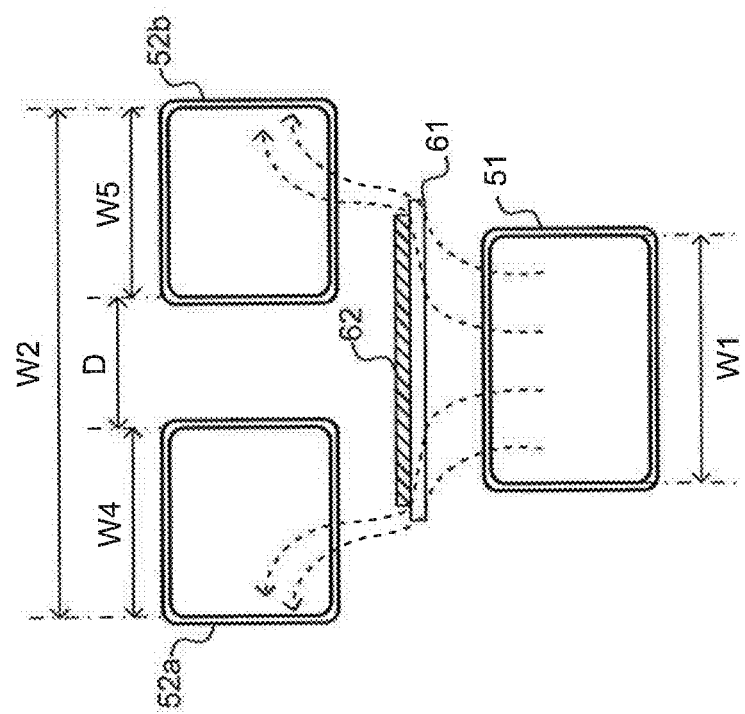
FIG. 14 is a diagram showing an example where the second power transmission coil includes two sub coils in Embodiment 4.

As shown in FIGS. 10A to 13, the second power transmission coil 52 is not limited to a single coil of which the opening has the diameter W2 greater than the diameter W1 of the opening of the first power transmission coil 51. The second power transmission coil 52 may include two sub coils. For example, as shown in FIG. 14, the second power transmission coil 52 may include a first sub coil 52a and a second sub coil 52b. Suppose that the diameter of the opening of the first sub coil 52a is W4, the diameter of the opening of the second sub coil 52b is W5, and the distance between the opening of the first sub coil 52a and the opening of the second sub coil 52b is D. In such a case, the sum of these dimensions (W4+D+W5) may be applied as the foregoing "diameter W2." In other words, the second power transmission coil 52 may be arranged so that the distance between the farthest position of the opening of the first sub coil 52a from the second sub coil 52b and the farthest position of the second sub coil 52b from the first sub coil 52a is greater than the diameter of the opening of the first power transmission coil 51.

Even in such a configuration, if the magnetic material sheet 62 is provided on the backside of the power reception surface of the power reception coil 61, as shown by the broken-lined arrows in the diagram, an alternating magnetic field is generated so that the lines of magnetic force extend from the opening of the first power transmission coil 51 to the openings of the first and second sub coils 52a and 52b of the second power transmission coil 52 through the end portions of the power reception coil 61 to circumvent the magnetic material sheet 62. In other words, despite the provision of the magnetic material sheet 62 on the backside of the power reception coil 61, the lines of magnetic force of the alternating magnetic field can reach the openings of the second power transmission coil 52. Power transfer can thus be performed without interrupting the alternating magnetic field.

In FIGS. 11B and 14, the power reception coil 61 on which the magnetic material sheet 62 is provided is arranged in an intermediate position between the first power transmission coil 51 and the second power transmission coil 52 (or, first and second sub coils 52a and 52b). However, the arrangement position of the power reception coil 61 and the magnetic material sheet 62 is not limited thereto. For example, the power reception coil 61 and the magnetic material sheet 62 may be arranged in a position near the first power transmission coil 51. The power reception coil 61 and the magnetic material sheet 62 may be arranged in a position near the second power transmission coil 52 (or, first and second sub coils 52a and 52b).

As described above, according to the present invention, a power transmission apparatus and a power transfer system that can efficiently transfer power regardless of the relative arrangement between the power reception coil and the power transmission coils can be provided.

The foregoing embodiments may be applied in appropriate combinations. For example, in Embodiment 2, the coil planes of the first and third power transmission coils 31 and 33 and the coil plane of the second power transmission coil 32 may be configured to be tilted (i.e., to form an angle φ) as in Embodiment 3. Similarly, in Embodiment 2, the opening of the second power transmission coil 32 may be configured to have a diameter greater than that of the opening of the first power transmission coil 31 as in Embodiment 4.

The present invention is not limited to the foregoing embodiments. For example, in the foregoing embodiments, the power transmission coils (i.e., first, second, and third power transmission coils) and the power reception coil are described to have generally rectangular annular shapes. However, the coil shapes are not limited thereto. For example, the coils may have a circular shape, an elliptical shape, a square shape, and other polygonal annular shapes. The power transmission coils and the power reception coil may be multi-turn coils.

In the foregoing embodiments, the power transmission coils (i.e., first, second, and third power transmission coils) and the power reception coil are described to resonate at the resonant frequency of 13.56 MHz. However, the frequency band is not limited thereto. For example, shortwave frequency bands such as a 6.78-MHz band may be used. Longwave frequency bands around 100 kHz may be used. In essence, the power transmission coils and the power reception coil have only to be configured to resonate at the same resonant frequency.

The foregoing embodiments have described the case of using a magnetic resonance system in which power is transferred by the power transmission coils and the power reception coil resonating at a common resonant frequency. However, an electromagnetic induction system in which the power transmission coils transmit power to the power reception coil by electromagnetic induction may be used.

In the foregoing embodiments, the load RX to which the transferred power is supplied is described to be the battery of the power reception apparatus and perform charging on the basis of the transferred power. However, the object of the power transfer is not limited to charging. For example, the alternating-current signal (alternating current) may be modulated to perform bidirectional or unidirectional communication by using the transferred power.

This application is based on a Japanese Patent Application No. 2015-238384 which is hereby incorporated by reference.

What is claimed is:

1. A power transmission apparatus for transmitting power to a power reception coil without contact, the power transmission apparatus comprising:
    a driving circuit;
    a first power transmission coil that is driven by the driving circuit;
    a second power transmission coil that is arranged outside the first power transmission coil;
    a third power transmission coil that is arranged inside the first power transmission coil; and
    a switching circuit for performing connection switching so that the first power transmission coil is connected to either one of the second and third power transmission coils.

2. The power transmission apparatus according to claim 1, comprising a measurement circuit for measuring a driving current or a driving voltage of the driving circuit, wherein the switching circuit performs the connection switching according to a measurement result of the measurement circuit.

3. The power transmission apparatus according to claim 2, comprising a storage circuit for storing a reference value of the driving current or the driving voltage, wherein
    the switching circuit compares the measurement result of the measurement circuit with the reference value, and performs the connection switching on a basis of the comparison result.

4. The power transmission apparatus according to claim 1, wherein:
    each of the first, second, and third power transmission coils is a planar coil; and
    the second power transmission coil is arranged so that a coil plane thereof lies in a same plane as a coil plane of the first power transmission coil does.

5. The power transmission apparatus according to claim 4, wherein the third power transmission coil is arranged so that a coil plane thereof lies in the same plane as the coil plane of the first power transmission coil does.

* * * * *